United States Patent [19]
Griffin

[11] Patent Number: 5,381,998
[45] Date of Patent: Jan. 17, 1995

[54] CYLINDER GAS VALVE

[75] Inventor: Gene A. Griffin, Dallas, Tex.

[73] Assignee: Texas Instruments Incorporated, Dallas, Tex.

[21] Appl. No.: 97,793

[22] Filed: Jul. 26, 1993

[51] Int. Cl.⁶ .................... F16K 11/048; F16K 47/04
[52] U.S. Cl. .................... 251/117; 251/144; 137/625.35; 222/402.16
[58] Field of Search .............. 251/117, 144; 137/625.35; 222/402.16

[56] References Cited

U.S. PATENT DOCUMENTS

| | | | |
|---|---|---|---|
| 696,329 | 3/1902 | Green | 137/625.35 X |
| 1,167,959 | 1/1916 | Wiechert | 137/625.35 X |
| 3,219,069 | 11/1965 | Kuffer | 222/402.16 X |

Primary Examiner—Arnold Rosenthal
Attorney, Agent, or Firm—W. James Brady, III; Richard L. Donaldson

[57] ABSTRACT

The invention is to a safety valve for gas cylinders which includes a valve housing 11, a movable valve stem 11a within the valve housing for opening and closing the valve, a restrictor 15 in the valve stem through which gas is dispensed from the gas cylinder, a first shoulder 13 on the valve stem for sealing the gas cylinder when the valve is in a first position, a second shoulder 14 on the valve stem for limiting gas flow from the cylinder through the restrictor when the valve is in a second position, and a reduced section 11d of the valve stem, between said first and second shoulders, through which the gas cylinder is filled when the valve stem is in a position between said first and second positions.

13 Claims, 3 Drawing Sheets

CYLINDER GAS VALVE

FIELD OF THE INVENTION

This invention relates to valves for gas cylinders, and more particularly to a valve with a safety flow restriction and easy fill capability.

BACKGROUND OF THE INVENTION

Gas cylinders used in the semiconductor processes, and other manufacturing process requiring gas flows utilize removable gas flow restrictors to limit the flow of a leak in the event of a break in the manifold or gas distribution system. The restrictor is usually threaded in the output port of the gas valve on the gas cylinder. When used with some gases, the restrictor is used with a filter. For example, when silane is used, any oxygen will cause $siO_2$ particles which can plug the restrictor orifice. Air and/or moisture can be trapped behind the restrictor, requiring a large number of vent purge cycles to removed the air/moisture. The restrictor and filter have to be removed to expedite filing the gas bottle. There is a possibility of failing to replace the restrictor after filing, providing a potential hazard.

SUMMARY OF THE INVENTION

The invention is a cylinder valve design with a built-in restrictor. The valve has three basic positions: closed, open for filing the cylinder, and open, discharging gas through a built-in restrictor. The restrictor is built in the valve stem, and does not have to be removed to fill the cylinder. There are two valve seats, one used when the valve is closed, and one used when gas is discharged through the restrictor orifice. When the bottle is being filled, the valve stem is positioned between the closed and gas discharge positions.

The technical advance represented by the invention, as well as the objects thereof, will become apparent from the following description of a preferred embodiment of the invention when considered in conjunction with the accompanying drawings, and the novel features set forth in the appended claims.

DESCRIPTION OF A PREFERRED EMBODIMENT

Figure 1:
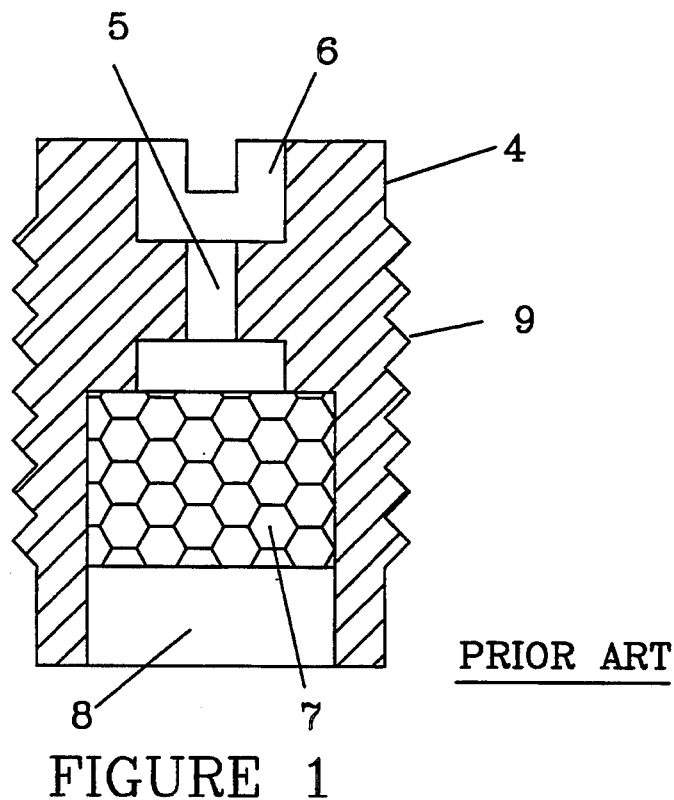
FIG. 1 illustrates prior art restrictor/filter units.

FIG. 1 is a cross-sectional view of a flow restrictor with a filter used in prior art valves. Flow restrictor 4 has an orifice 5 that extends through the restrictor. Gas from a gas cylinder follows in opening 8 through filter 7, orifice 5 and out opening 6. Restrictor 4 has threads 9 that thread into a port in the valve, for example port 12, FIG. 2a.

Figure 2C:
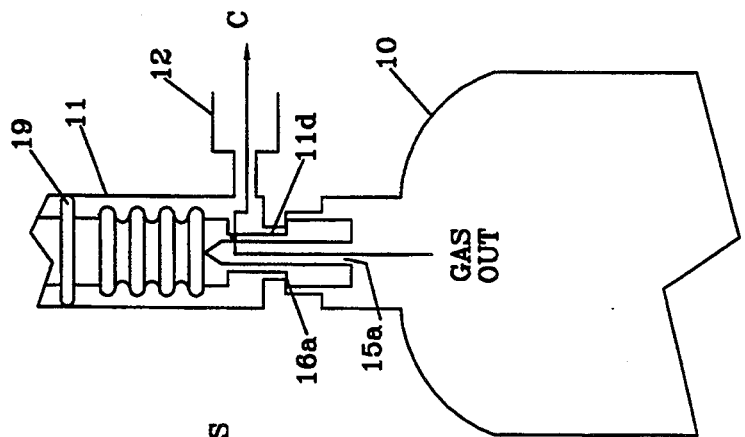
FIGS. 2a, 2b and 2c show one embodiment of the present invention in the closed, fill and gas discharge positions.
Figure 2B:
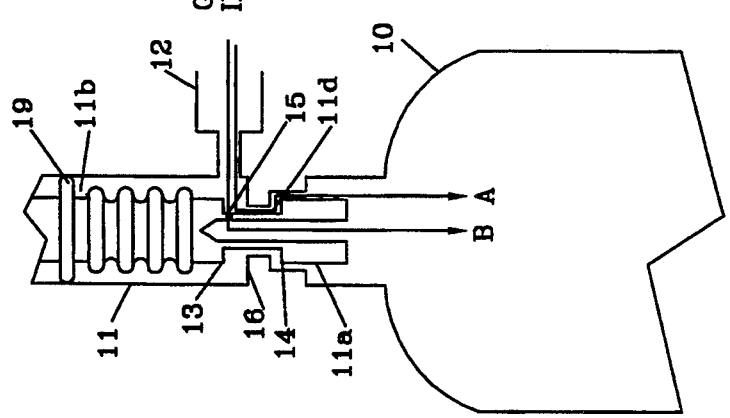
Figure 2A:
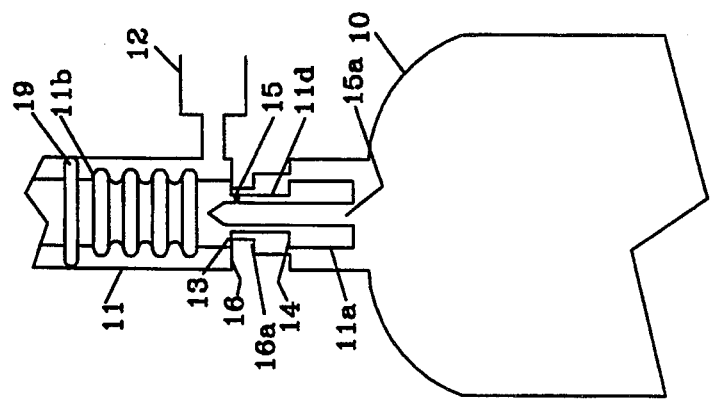

FIG. 2a, 2b and 2c illustrate a cylinder valve design with a built-in restrictor, eliminating the need for a restrictor/filter as illustrated in FIG. 1. FIG. 2a shows valve 11 with valve stem 11a in a closed position. The valve is closed by a pneumatic operator or by turning a knob, not illustrated, that moves the valve stem, moving it to its extreme downward position. When closed, the valve stem seal shoulder 13 seats against shoulder 16 preventing the flow of gas out of or into to cylinder 10 through port 12. Gas flow up and out the stem is prevent by, for example, a seal 19, preventing gas from entering the valve body 11.

FIG. 2b shows the valve opened to permit filling of the cylinder 10 with gas. The valve stem has been moved upward moving the seal 13 away from seal shoulder 16. This permits gas to flow into cylinder 10 around the seal shoulders through the reduced diameter section 11d of valve stem 11a, as indicated by arrows A and B. Arrow A shows unrestricted gas flow around the seal shoulders into cylinder 10. There is a small amount of gas flow through restrictor orifice 15. When cylinder is full of gas, then the valve is closed by moving valve stem 11a to its extreme downward position, as illustrated in FIG. 2a.

FIG. 2c shows valve 11 opened, after port 12 has been connected to a gas distribution manifold. Valve 11 is opened by moving valve stem 11a to its extreme upward position. Seal 14 is moved into engagement with shoulder 16a sealing off the path A through reduced diameter section 11d, FIG. 2b. Gas flow is shown by path C. Gas flows through central opening 15a in the end of valve stem 11a, and flows through restrictor orifice 15 and port 12. Restrictor orifice 15 may be made any size, depending upon the desired size of the orifice.

The valve configuration of FIGS. 2a, 2b and 2c permit vent-purge of the gas manifold and distribution lines connected to port 12 without the obstruction of a restrictor/filter between the gas manifold and the inside of port 12 adjacent valve stem 11a. Nor is there the possibility of forgetting to replace a restrictor/filter after filling the cylinder since there is none in the configuration of FIGS. 2a–2c.

Figure 3C:
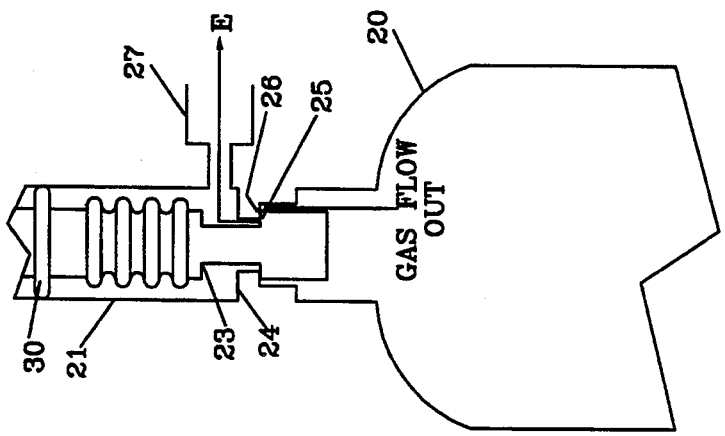
FIGS. 3a, 3b and 3c show another embodiment of the present invention in the closed, fill and gas discharge positions.
Figure 3B:
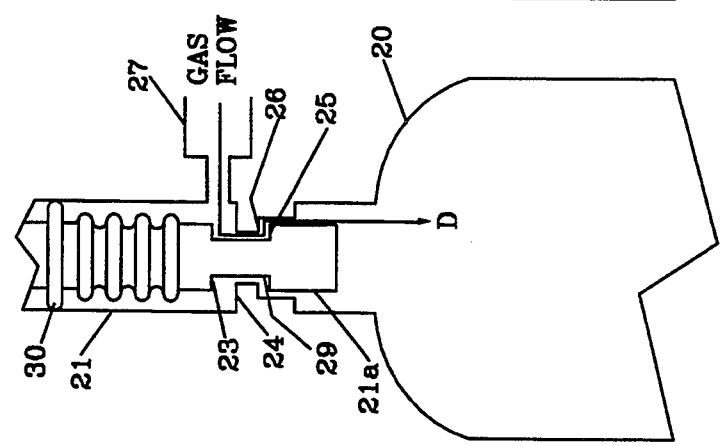
Figure 3A:
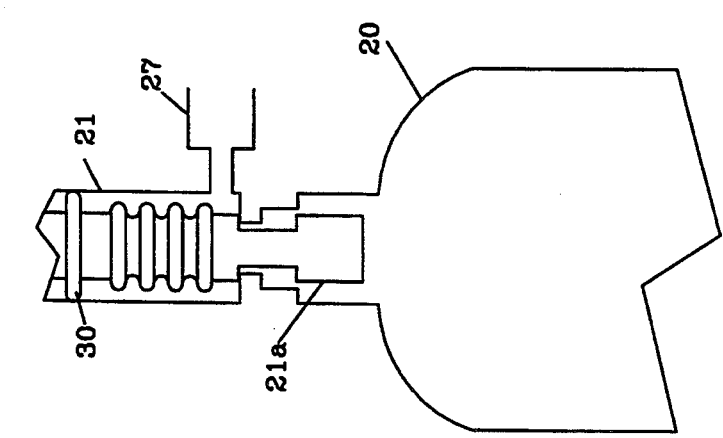

FIG. 3a, 3b and 3c illustrate a second embodiment of a valve, including a gas restrictor concept different from that illustrated in FIGS. 2a–2c. In FIG. 3a, valve stem 21a of valve 21 is in its lowered position sealing cylinder 20. Valve stem seal 23 is sealed against shoulder 24 preventing gas from entering or exiting cylinder 20.

In FIG. 3b, valve 21 is opened to the filling position with gas flowing though port 27 around the reduced diameter portion 29 of value stem 21a. Gas flow is indicated by path D. Gas flow up valve stem 21a is prevented by a seal, such as seal 30 around valve stem 21a inside vale 21 above the port 27 opening.

FIG. 3c shows valve stem 21a in its extreme upward position restricting gas flow out of or into cylinder 20 by seating the valve stem shoulder 25 against shoulder 26. To enable gas to flow out of cylinder 20 into port 27, a restrictor groove 40 is cut into the surface of shoulder 25.

Figure 4A:
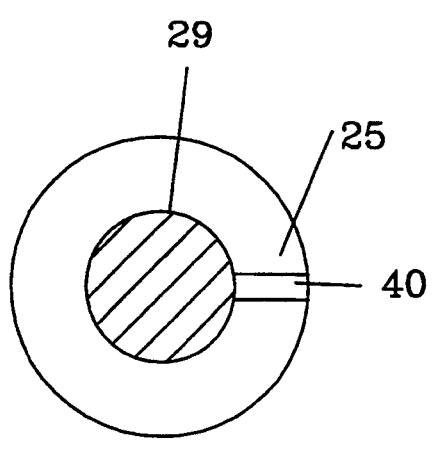
FIGS. 4a and 4b show the orifice in the stem of the valve of FIGS. 3a, 3b and 3c.
Figure 4B:
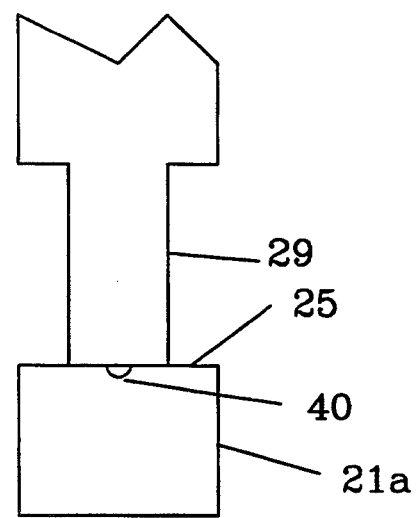

The flow restrictor groove associated with the flow restricting concept illustrated in FIGS. 3a–3c is illustrated in FIG. 4. FIG. 4a is a top partial view showing the restrictor groove cut in the surface of shoulder 25. Groove 40 is cut radially on the surface of shoulder 25, such that when shoulder 25 seals against shoulder 26, no seal is made through groove 40. Groove 40 may be made any size, dependent upon flow restriction. FIG. 4b is a side view showing groove 40 in shoulder 25. Although groove 40 is shown to be semicircular, it can be any shade.

In both the configurations of FIGS. 2a–2c and 3a–3c, the valve may be closed to seal off the bottle, opened to permit unrestricted flow of gas into the cylinder when filling, and then adjusted to cause gas to flow out of the bottle through a restrictor. The restrictor does not have to be removed from the valve as in the prior art. Purging and evacuating gas manifolds and lines is easier and more efficient since there is no restrictor/filter to block purging up to the cylinder valve stem, nor does the restrictor have to be removed in the cylinder filling process.

What is claimed is:

1. A safety valve for gas cylinders, comprising:
   a valve housing attachable to a gas cylinder;
   a movable valve stem within the valve housing for opening and closing the valve, and dispensing gas upward through the valve;
   a first channel internal to said valve stem for flowing gas out of a gas cylinder;
   a second channel external to said valve stem for flowing gas into the gas cylinder;
   a restrictor in the valve stem at one end of said first channel through which gas is dispensed from the gas cylinder;
   a first shoulder on the valve stem for sealing the gas cylinder when the valve is in a first position preventing gas from flowing into or out of said cylinder;
   a second shoulder on the valve stem for limiting gas flow only through the valve stem and through the restrictor when the valve is in a second position; and
   a reduced section of the valve stem, between said first and second shoulders, permitting gas to flow around said first and second shoulders when the gas cylinder is filled, and when the valve stem is in a position between said first and second positions.

2. The safety valve according to claim 1, including a restrictor orifice in said second shoulder.

3. The safety valve according to claim 2, wherein the valve stem has a circular cross section and said restrictor orifice extends radially in said second shoulder.

4. The safety valve according to claim 1, wherein said valve stem has a hollow portion therein and a restrictor orifice extending between said hollow portion and said reduced section of the valve stem.

5. The safety valve according to claim 1, wherein said reduced section extends between said first and second shoulders.

6. A safety valve for gas cylinders, comprising:
   a valve housing attachable to a gas cylinder;
   a movable valve stem within the valve housing for opening and closing the valve, said valve stem having a hollow portion therein and a restrictor orifice extending between said hollow portion and said reduced section of the valve stem;
   a first channel internal to said valve stem for flowing gas upward and out of a gas cylinder;
   a second channel external to said valve stem for flowing gas into the gas cylinder;
   a first shoulder on the valve stem for sealing the gas cylinder when the valve is in a first position, preventing gas from flowing into or out of said cylinder;
   a second shoulder on the valve stem for limiting gas flow only through the valve stem;
   a restrictor in the valve stem at one end of said first channel through which gas is dispensed from the gas cylinder through the restrictor when the valve stem is in the second position; and
   a reduced section of the valve stem, between said first and second shoulders, permitting gas to flow around said first and second shoulders when the gas cylinder is filled, and when the valve stem is in a position between said first and second positions.

7. The safety valve according to claim 6, including a restrictor orifice in said second shoulder.

8. The safety valve according to claim 7, wherein said restrictor orifice extends radially in said second shoulder.

9. The safety valve according to claim 6, wherein said reduced section extends between said first and second shoulders.

10. A safety valve for gas cylinders, comprising:
    a valve housing attachable to a gas cylinder;
    a movable valve stem within the valve housing for opening and closing the valve, and for dispensing gas upward through the valve stem;
    a first shoulder on the valve stem for sealing the gas cylinder when the valve is in a first position;
    a second shoulder on the valve stem for limiting gas flow from the cylinder when the valve stem is in a second position;
    a reduced section of the valve stem, between said first and second shoulders, permitting gas to flow around said first and second shoulders when the gas cylinder is filled, and when the valve stem is in a position between said first and second positions
    a hollow region in the valve stem; and
    a restrictor in the valve stem connecting the hollowing region and the reduced section through which gas is dispensed from the gas cylinder when the valve stem is in a second position.

11. The safety valve according to claim 10, wherein the restrictor orifice is in said second shoulder.

12. The safety valve according to claim 11, wherein the valve stem has a circular cross section and said restrictor orifice extends radially in said second shoulder.

13. The safety valve according to claim 10, wherein said reduced section extends between said first and second shoulders.

* * * * *